United States Patent [19]
Andruszkiw et al.

[11] Patent Number: 4,616,974
[45] Date of Patent: Oct. 14, 1986

[54] WIND DRIVEN POWER GENERATING APPARATUS

[76] Inventors: Walter Andruszkiw, 31415 Mound Rd., Warren, Mich. 48092; Roman Andrushkiw, 42400 Malbeck, Sterling Heights, Mich. 48077

[21] Appl. No.: 756,599
[22] Filed: Jul. 19, 1985
[51] Int. Cl.⁴ .............................................. F03D 7/04
[52] U.S. Cl. ...................................... 415/4; 416/142; 416/176; 415/75
[58] Field of Search ....................... 416/142 B, 176 A; 415/2 A-4 A, 75, 72

[56] References Cited

U.S. PATENT DOCUMENTS

| 84,237 | 11/1868 | Waite | 415/75 |
| 893,052 | 7/1908 | Carlson | 416/176 A |
| 1,198,410 | 9/1916 | Bjornson | 416/119 X |
| 1,345,022 | 6/1920 | Oliver | 415/2 A |
| 1,684,469 | 9/1928 | Buda | 415/75 X |
| 2,563,279 | 8/1951 | Rushing | 415/3 A |
| 4,178,124 | 12/1979 | Puskas | 416/175 A X |
| 4,213,734 | 7/1980 | Lagg | 415/2 A X |
| 4,218,175 | 8/1980 | Carpenter | 415/2 A |
| 4,342,539 | 8/1982 | Potter | 416/142 B X |
| 4,530,638 | 7/1985 | Andruszkiw et al. | 416/142 B X |

FOREIGN PATENT DOCUMENTS

| 111376 | 11/1928 | Austria | 415/2 A |
| 973968 | 2/1951 | France | 415/2 A |
| 92370 | 7/1981 | Japan | 416/142 B |
| 62973 | 4/1982 | Japan | 416/142 B |
| 188782 | 11/1982 | Japan | 415/2 A |
| 7905389 | 1/1980 | Netherlands | 415/2 A |

Primary Examiner—Everette A. Powell, Jr.
Attorney, Agent, or Firm—Myron B. Kapustij

[57] ABSTRACT

A wind driven power generating apparatus which is automatically vertically adjustable depending upon the wind velocity.

6 Claims, 7 Drawing Figures

WIND DRIVEN POWER GENERATING APPARATUS

SUMMARY OF THE INVENTION

The instant invention is directed to a wind driven power generating apparatus. More particularly the instant invention is directed to wind driven power generating apparatus which is automatically vertically adjustable depending upon the wind velocity. When the wind velocity is high the apparatus is automatically lowered into a well in which it is vertically adjustably mounted so that the force of the wind impinging thereon is decreased. When the wind velocity is low the apparatus is automatically raised or extended from out of the well so that maximum advantage is taken of the available wind force.

DESCRIPTION OF THE INVENTION

The instant invention is directed to a wind driven power generating apparatus which is provided with means for vertical adjustment within a well in which it is disposed, said adjustment being dependent upon and controlled by the wind velocity. Thus, when the wind velocity is high the power generating apparatus is automatically retracted into a well in which it is vertically adjustably seated. When the wind velocity is low the apparatus is automatically raised or extended out of the well in order to obtain maximum advantage of the available wind force.

In another embodiment of the instant invention the rotation of the helical power vanes by the wind force can be maintained at a generally constant rate by either raising the power generating apparatus out of its well and into the full force of the wind at low wind velocities, or by lowering the power generating apparatus partially into the well as the wind velocity increases.

As illustrated in FIGS. 1–5 it is comprised of a horizontally extending hollow cylindrical or tubular housing 20 containing a horizontally extending drive shaft 50. Drive shaft 50 is rotatably mounted in the interior of the hollow tubular housing 20. Drive shaft 50 has fixedly mounted thereon helical power vanes 60 and 60a. In operation the wind impinges upon these vanes 60 and 60a thereby causing rotational movement of these vanes and the consequent rotational movement of drive shaft 50 about its longitudinal axis. The vanes are divided into two groups, 60 and 60a, which are axially spaced appart from each other and are disposed on either side of the central portion of the drive shaft 50.

Figure 3:
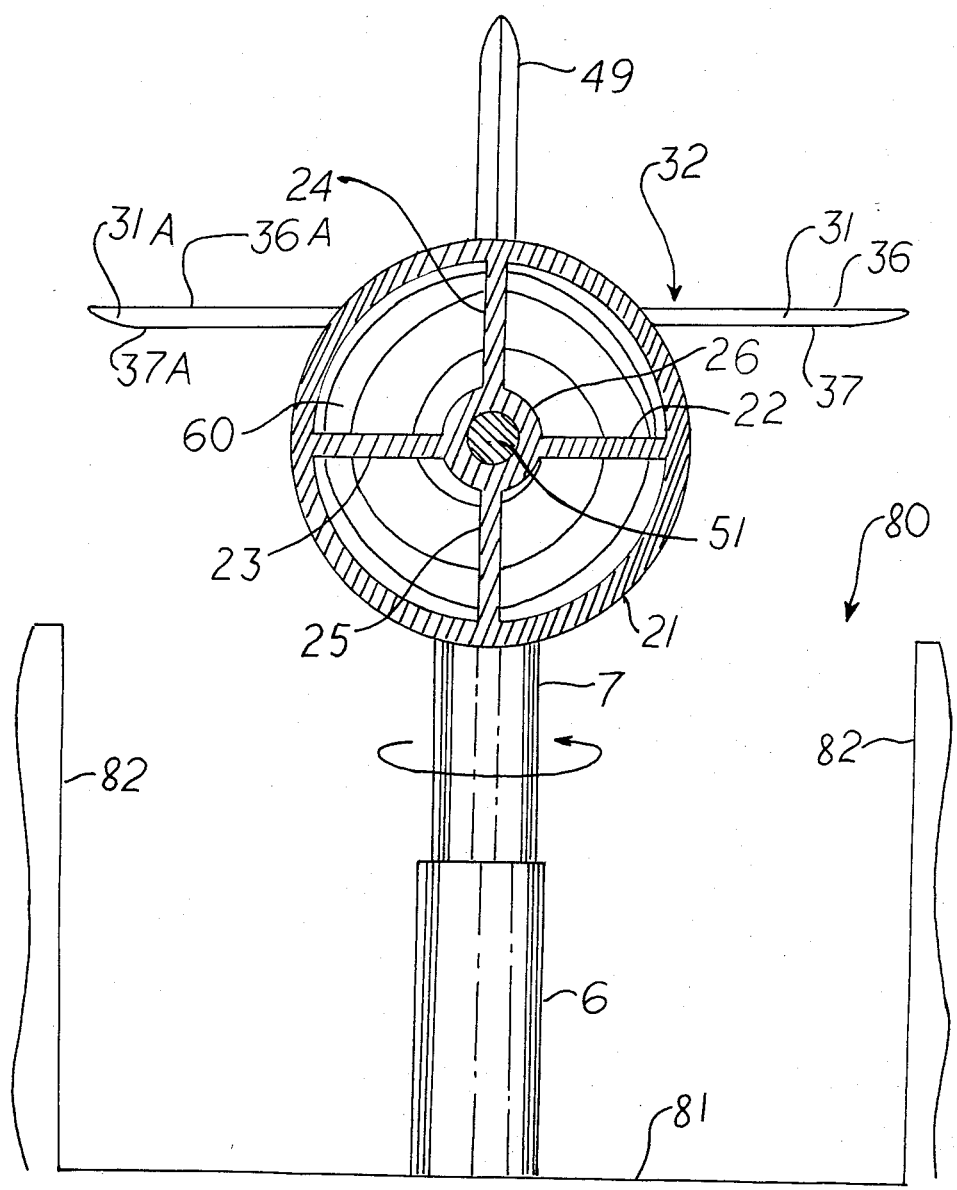
FIG. 3 is a front view of the apparatus of the instant invention in a fully extended or raised position.
Figure 4:
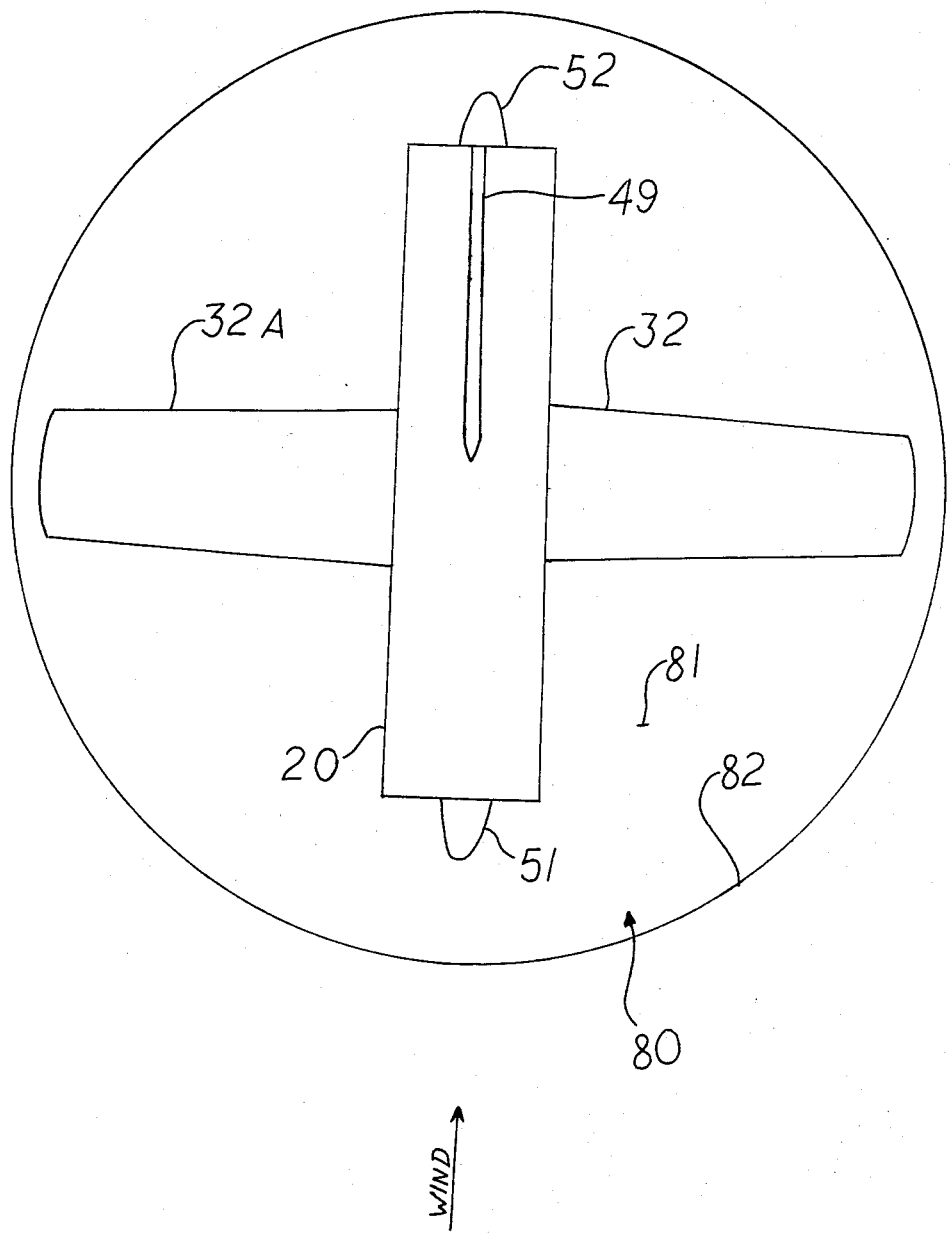
FIG. 4 is a top plan view of the apparatus of the instant invention.
Figure 5:
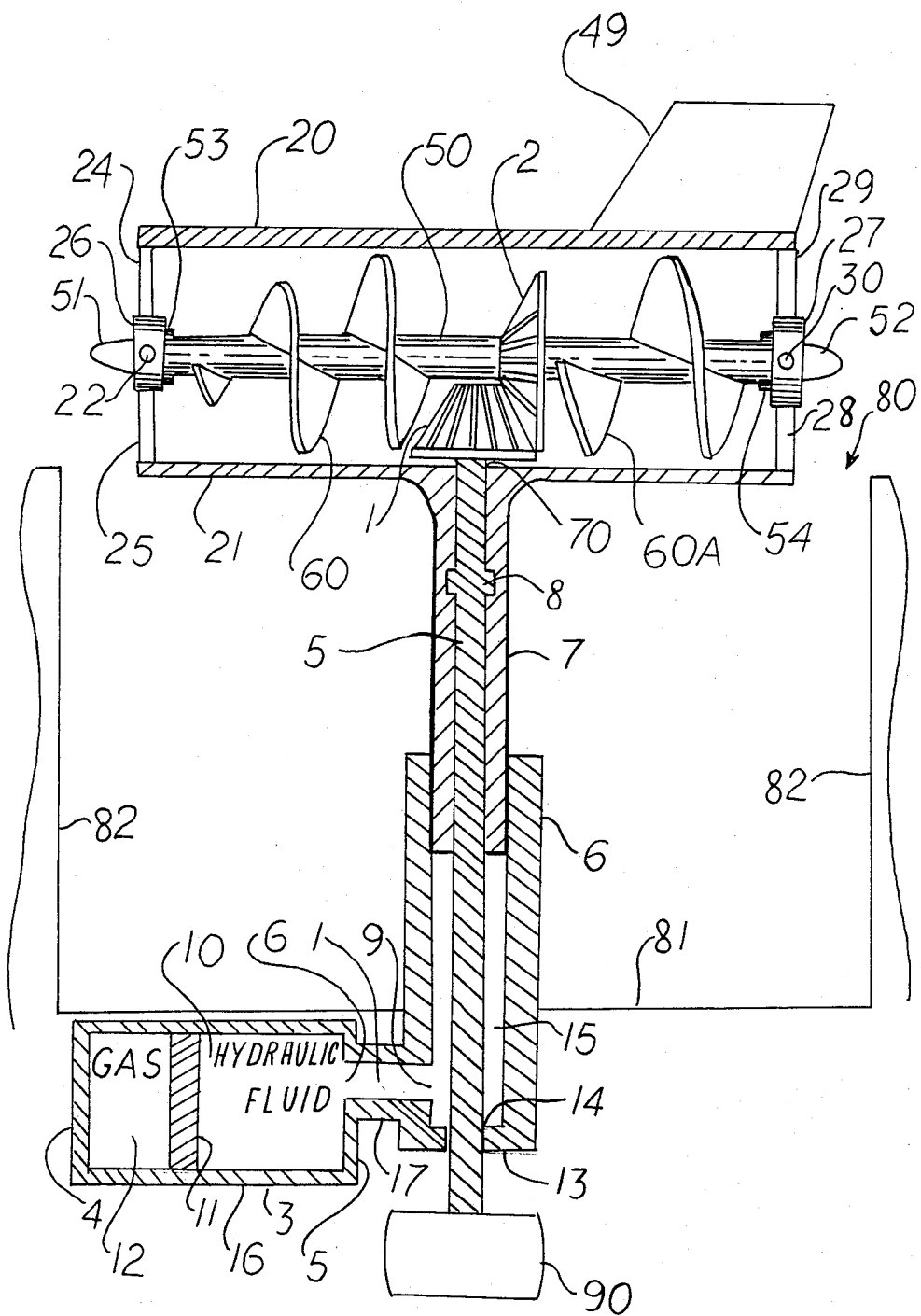
FIG. 5 is a side sectional view of the apparatus of the instant invention in a fully raised or extended position.
Figure 6:
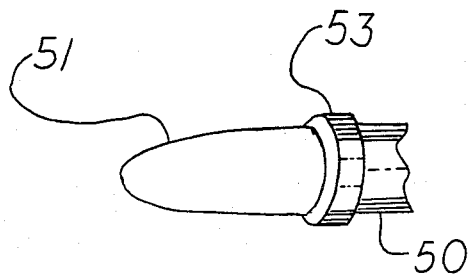
FIG. 6 is a perspective view of the front end of the horizontal drive shaft.
Figure 7:
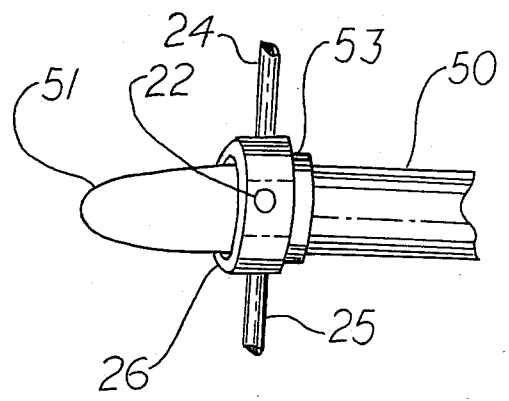
FIG. 7 is a perspective view of the front end of the horizontal drive shaft of FIG. 6 rotatably mounted in the annular support member of the cylindrical casing.

As best shown in FIGS. 5, 6 and 7 the drive shaft 50 has two end or terminal portions 51 and 52. These end portions are generally conical in shape. Adjacent to and disposed axially inwardly of these end portions 51 and 52 are raised or bossed sections 53 and 54. As illustrated in FIGS. 3, 5 and 7 the shaft 50 is rotatably mounted in the tubular casing 20 by means of two annular support members 26 and 27. The annular support members 26 and 27 are fixedly mounted to the tubular casing 20 at both ends thereof. The annular support members are fixedly attached to the tubular casing 20 by means of radially extending posts 23–26 and 28–31. These posts 23–26 and 28–31 are attached at one end thereof to annular support members 26 and 27 respectively and at the other end thereof to the wall 21 of tubular casing 20. The posts 23–26 and 28–31 are disposed adjacent to the open ends of tubular casing 20. The shaft 50 is rotatably mounted in the annular support members 26 and 27 by having its two end portions 51 and 52 inserted into the annular support members 26 and 27 respectively. Horizontal movement of the shaft 50 is prevented by means of the two raised portions 53 and 54. The two raised or bossed portions 53 and 54 have diameters which are greater than the diameters of the openings of annular members 26 and 27 into which are inserted the two end portions 51 and 52 of the shaft 50. Fixedly mounted on the central section of shaft 50, intermediate the two sets of helical vanes 60 and 60a, is bevel gear 2. This bevel gear 2 is longitudinally disposed on shaft 50.

Tubular casing 20 is supported by vertcally extending support column 7. Support column 7 is circular in cross section and has a cavity extending longitudinally therein. That is to say, support column 7 is in the form of a holow tube. Support column 7 is attached at its upper or top end to tubular casing 20. Tubular casing 20 has an opening 70, which is circular in cross section, extending through its bottom. This opening 70 is in communication with the cavity in support column 7. Rotatably mounted in tubular support column 7 is a vertically extending power transmitting shaft 5. The upper or top section of shaft 5 extends through opening 70 into the interior of tubular casing 20. Fixedly mounted at the top or upper end of shaft 5 is bevel gear 1. Bevel gear 1 is vertically extending and is in meshed contact with bevel gear 2 on shaft 50. At its other end, as illustarted in FIG. 5, power transmitting shaft 5 is connected to an electrical power generator 90.

The wind impinging upon helical vanes 60 and 60a causes rotational movement of these vanes. Since vanes 60 and 601 are fixedly mounted on shaft 50 rotational movement of these vanes causes shaft 50 to also rotate. The rotation of shaft 50 results in the rotation of bevel gear 2 which is fixedly mounted on shaft 50. Rotation of bevel gear 1 in turn rotates bevel gear 1 which is in meshed contact with bevel gear 2. Rotation of bevel gear 1 results in the rotation of power transmitting shaft 5 upon which bevel gear 1 is fixedly mounted. Rotation of power transmitting shaft 5 results in the driving of power generator 90 thereby producing electrical power.

The means and structures for lowering or raising the tubular casing 20 with its associated structures as described hereinafore in the well 80 will now be described.

A vertically extending tubular member 6 is fixedly mounted in floor 81 of well 80. As shown in FIG. 5 tubular member 6 is hollow and has a vertically extending cavity 15 therein. Tubular member 6 is open at its upper end and telescopically receives the bottom portion of vertical support member 7 therein. Support member 7 is free to move in a vertical direction within tubular member 6 and to rotate about its longitudinal axis. At its bottom end tubular member 6 is closed by a horizonatl flat end wall 13. Wall 13 is circular in cross section and has a centrally disposed opening 14, circular in cross section, extending therethrough. Opening 14 has the bottom portion of power transmitting shaft 5 extending therethrough.

As illustrated in FIG. 5 adjacent the bottom end of tubular member 6 is a radially extending opening 9 which serves to connect cavity 15 in tubular member 6 with port 1 which communicates with internal cavity 10 in cylinder 16.

Cylinder 16 is comprised of cylindrical side wall member 3 and two generally flat, circular in cross section, end wall members 4 and 5. End wall member 5 has an opening 6, circular in cross section, centrally located therein which communicates with port 1. A free floating piston 11, freely movable in an axial or longitudnal direction, is disposed in cylinder 16. The piston 11 divides the hollow interior of cylinder 16 into two cavities 12 and 10. Cavity 12 is totally enclosed and sealed by end wall member 4, side wall member 3, and piston 11. Cavity 12 is filled with a compressable gas. Cavity 10 in cylinder 16, cavity 15 in tubular support member 6, and port 1 are all filled with a hydraulic fluid.

Upon vertcally downward movement of support member 7 in cavity 16 the hydraulic fluid in cavity 15 is forced via port 1 into cavity 10 forcing piston 11 to move against the gas and compressing the gas in cavity 12 by decreasing the volume of cavity 12. This controls or regulates the downward movement of support member 7 within member 6, and also compresses the gas in cavity 12 thus storing up energy in the compressed gas to return or push up member 7 in a vertically upward direction.

Movement of support member 7 in a vertically upward direction in member 6 is accomplished by expansion of the compressed gas in cavity 12, causing movement of piston 11, thereby causing the hydraulic fluid to flow out of cavity 10 and into cavity 15 and push against the bottom of member 7. This raises the member 7 which is telescopically mounted in member 6.

Figure 1:
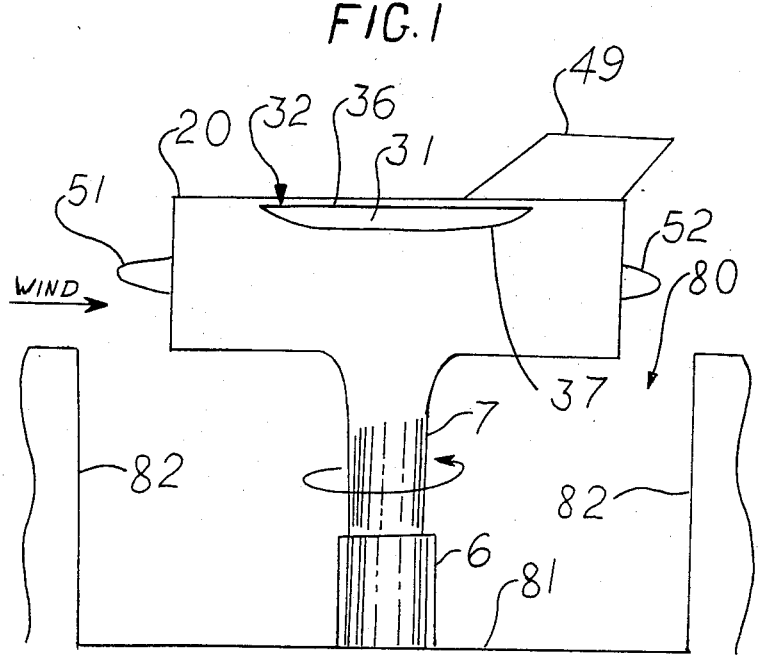
FIG. 1 is a side elevational view of the apparatus of the instant invention in a fully extended or raised position.
Figure 2:
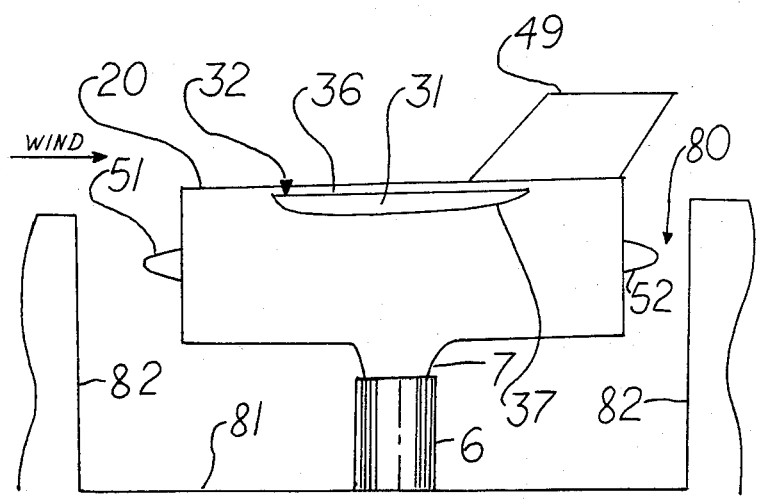
FIG. 2 is a side elevational view of the apparatus of the instant invention in a fully lowered or retracted position.

Movement of member 7 in a vertically downward direction within member 6 is accomplished by the wind acting upon the wing system 32 of the apparatus. Wing system 32 is comprised of two wings 31 and 31a which are fixedly mounted to casing 20. The wings 31 and 31a, as illustrated in FIGS. 1-3, have flat upper surfaces 36 and 36a and rounded or convex lower or bottom surfaces 37 and 37a. The wing system of the instant invention is thus the reverse of the wing system of an airplane. The instant wing system instead of providing lift, as does the wing system of an aircraft, is forced in a vertically downward direction by the wind blowing over its surfaces. The greater the wind velocity over the wing system, the greater the downward forces or inverse-lift of the wing system.

Located at the rear and top of casing 20 is a vertically extending directional control surface 49. Directional control surface 49 is a generally flat vertically extending surface with a knife-like or sharp leading edge. This directional control surface functions to turn the casing 20 so that its front orifice is always facing the wind.

Thus, while the wing system combined with the aforedescribed cyclinder 16, compressed gas, and hydraulic fluid serve to control the vertical telescoping movement of the apparatus within the well 80, the directional control surface 49 controls the rotational movement of the apparatus so that the helical power vanes 60 are always facing the wind.

In the operation of the wind driven power generating apparatus the wind acting upon the directonal control surface 49 causes it to rotate, along with the casing 20 to which it is attached, so that its sharp leading edge is facing directly into the wind.

This in turn rotates casing 20, support member 7, and power transmitting shaft 5 which is rotatably mounted in member 7. Power transmitting shaft 5 is secured against independent vertical movement by means of a raised or bossed section 8 which is disposed in a correspondingly shaped hollow section in the interior of member 7. Thus power transmitting shaft 5 moves in conjunction with the vertical movement of member 7.

That is to say, power transmitting shaft 7 always moves in concert with the vertical movements of member 7 and casing 20. This assures that the bevel gears 1 and 2 are always in meshed contact.

The casing 20 is automatically lowered into or extended out of the well 80 in which it is seated depending upon the wind velocity. Thus, when the wind velocity is high the inverse-lifting force of the wing system is increased to the point at which it ovecomes the resistance to compression of the gas in cavity 12. The gas is compressed and the apparatus is lowered into the well. That is to say, the downward force exerted by the wing system is greater than the upward force exerted by the compressable gas. This is accomplished by vertical support member 7 being forced telescopically downward in tubular support member 6. This downward movement of support member 7 forces the hydraulic fluid present in cavity 15 into cavity 10 in cylinder 16 by decreasing the volume of cavity 15. This displacement of the fluid from cavity 15 into cavity 10 causes movement of piston 11 to compress the gas in cavity 12 by decreasing the volume of cavity 12. When the wind velocity falls below a certain critical value the expansion energy of the compressed gas is greater than the downward force exerted by the wing system, thus resulting in the expansion of the gas, the movement of piston 11 into cavity 10, displacement of the fluid from cavity 10 into cavity 15, and the resultant upward movement of member 7 caused by the rising level of hydraulic fluid in cavity 15.

As illustarted in FIG. 1, which shows the instant wind driven power generating apparatus in a fully extended or raised position, the bottom of casing 20 is even with the lip of wall 82 of the well 80, which may have a generally circular cross-section. In this position the power vanes 60 and 60a have maximum exposure to the wind.

As illustrated in FIG. 2, which shows the instant apparatus in a fully retracted or lowered position, the top of casing 20 is slightly above the lip of wall 82 of the well. In this position the power vanes 60 and 60a have a minimum exposure to the wind.

The vertical adjustment of the power generating apparatus within the well 80 offers several very improtant advantages. The first of these being that the power generating apparatus is protected from damage due to very high wind velocities such as those present during severe wind storms. Thus, for example, if the wind velocity starts to attain dangerous levels, the power generating apparatus is automatically lowered into the well, thereby protecting it from breakage and damage. This is of great advantage during storms, conditions of exceptionally high winds, and the like.

The second of these advantages is that the rotation of shaft 50, and the consequent power output of the apparatus, can be maintained at a constant rate regardless of the wind velocity. The rotational speed of shaft 50 may be expressed by the general formula $R = VA$ wherein R represents the rotational speed of the shaft 50, e.g., revolutions per minute; V is the wind velocity, e.g., miles per hour; and A is the total surface area of the vanes 60 and 60a exposed to the wind, e.g., square feet. If it is desired to maintain R constant, and since variable V (wind velocity) is generally beyong control, A can be varied or adjusted so that $V \times A$ gives a constant R for varying values of V. Thus, for example, if V is large A can be made smaller or decreased by lowering the casing 20 within the well 80, and if V is small or decreases then A can be increased proportionally by raising the casing 20 out of the well so that R is maintained constant. In practice, the apparatus of the instant invention can be so adjusted, by adjustment of the amount of gas in cyclinder 16 and/or the size of the cavity 12 in which the compressible gas is enclosed, that the rotation of shaft 50 is maintained at a constant rate over a very wide range of wind velocities. Thus, for example, when the wind velocity is high the apparatus is automatically lowered into the well by mechanisms as described hereinafore. This results in less surface area of vanes 60 and 60a being exposed to the wind and, therefor, according to the formula above the rotational speed of the shaft remains fixed at the same rate as when wind velocities are lower and more surface area of the vanes is exposed to the wind. If the wind velocity decreases the apparatus is automatically extended or raised out of the well thereby exposing a greater surface are of the vanes to the action of the wind, thereby resulting in the rotational speed of the shaft 50 being the same as that when conditions of higher wind velocities were existant.

By adjusting the forces necessary to compress the gas in the cylinder a predetrmined rotational speed of shaft 50 may be selected. Thus, for example, if the force necessary to compress the gas in the cylinder is large (said force being provided by the downward motion exerted upon member 7 by the inverted wing system 32) the rotational speed of shaft 50 will be high. This is due to the fact that a high wind velocity is required for the wing system 32 to develope sufficient inverse-lift to overcome the resistance to compression of the gas in the cylinder and thereby lower the apparatus into the well. Therefore, vanes 60 and 60a will have a large portion of their surface area exposed to the wind, which is blowing at a high velocity, and since V and A are both high R is also high. If, on the other hand, the resistance to compression of the gas is low, as by providing a smaller amount of gas in the cylinder, a lower wind velocity is required to develope sufficient inverse-lift by the wing system to compress the gas and thus retract or lower the apparatus into the well. Therefore, vanes 60 and 60a will have less of their surface area exposed to a wind force of lower velocity, thereby resulting in a slower rotation of shaft 50, i.e., R.

The helical vanes illustrated in FIG. 5 have an increasing radius, with the leading vanes having a smaller radius than the end vanes. While this is a preferred embodiment it is to be understood that the vanes 60 and 60a may all have the same radius.

It will thus be seen that the objects set forth above among those made apparant from the preceding description and drawings are efficiently attained, and since certain changes may be made in the structures set forth and described without departing from the scope of the instant invention, it is intended that all matters contained in the above description and drawings shall be interperted as illustrative and not in a limiting sense.

What is claimed is:

1. A vertically adjustable wind driven power generating apparatus comprised of, in combination, a well in which is vertically movably mounted a wind driven power generating apparatus comprised of:
    (i) a wind driven power generating means comprised of a tubular housing having rotatably mounted therein a horizontally extending shaft having a centrally disposed bevel gear fixedly attached thereto and a plurality of helical vanes disposed longitudinally on both sides of said bevel gear;
    (ii) means for vertical movement of said tubular housing within said well comprised of (a) a hollow vertical support column having a circular cross section and having one end thereof attached to the bottom of said tubular housing and (b) a vertically extending hollow tubular member having a hollow interior fixedly mounted at its bottom end in the floor of said well and being open at its other end, said tubular member adapted to telescopically receive said vertical support column in its open end;
    (iii) vertical movement control means comprised of (a) downward movement control means comprising an inverted wing system generating inverse-lift mounted on said tubular housing, and (b) upward movement control means comprising a cylinder having an axially movable piston therein, said piston defining an enclosed cavity within said cylinder which contains a compressible gas and a second cavity containing a hydraulic fluid and being in communication with the hollow interior of said vertically extending tubular member; and
    (iv) power transmission means comprising a vertically extending power transmitting shaft rotatably mounted in said hollow vertical support column, said power transmitting shaft having a top end extending into said tubular housing and having fixedly mounted at said top end a bevel gear which is in meshed contact with said bevel gear of said horizontally extending shaft disposed in said tubular housing and a bottom end which is connected to and drives a power generator.

2. The apparatus of claim 1 which has a directional control means comprised of a vertically extending control surface adapted to rotate said tubular housing into the wind.

3. The apparatus of claim 2 wherein said vertically extending control surface is mounted at the top of said tubular housing.

4. The apparatus of claim 3 wherein said vertically extending control surface has a sharp leading edge.

5. The apparatus of claim 1 wherein said helical vanes have a varying radius, with the leading vanes having a smaller radius than the end vanes.

6. The apparatus of claim 1 wherein all of said helical vanes have the same radius.

* * * * *